US008046464B2

(12) United States Patent
Wang et al.

(10) Patent No.: US 8,046,464 B2
(45) Date of Patent: Oct. 25, 2011

(54) QUALITY OF SERVICE RESOURCE MANAGEMENT APPARATUS AND METHOD FOR MIDDLEWARE SERVICES

(75) Inventors: Guijun Wang, Renton, WA (US); Alice Chen, Redmond, WA (US); Changzhou Wang, Bellevue, WA (US); Casey Fung, Kent, WA (US); Stephen Uczekaj, Bellevue, WA (US); Yichi C Pierce, Woodinville, WA (US)

(73) Assignee: The Boeing Company, Chicago, IL (US)

( * ) Notice: Subject to any disclaimer, the term of this patent is extended or adjusted under 35 U.S.C. 154(b) by 1292 days.

(21) Appl. No.: 10/797,523

(22) Filed: Mar. 10, 2004

(65) Prior Publication Data

US 2005/0204054 A1    Sep. 15, 2005

(51) Int. Cl.
*G06F 15/16* (2006.01)
(52) U.S. Cl. ........................................................ 709/226
(58) Field of Classification Search .......... 709/203–207, 709/219, 223–229, 235; 715/751–753; 370/395.2, 370/395.21, 395.4, 230, 230.1, 231; 717/102; 719/315
See application file for complete search history.

(56) References Cited

U.S. PATENT DOCUMENTS

| 5,533,021 A * | 7/1996 | Branstad et al. ............ 370/396 |
|---|---|---|
| 6,529,950 B1 * | 3/2003 | Lumelsky et al. ........... 709/218 |
| 6,538,992 B1 * | 3/2003 | Subbiah et al. .............. 370/230 |
| 6,631,135 B1 * | 10/2003 | Wojcik ....................... 370/395.21 |
| 6,681,232 B1 * | 1/2004 | Sistanizadeh et al. ..... 707/104.1 |
| 6,816,882 B1 * | 11/2004 | Conner et al. ............... 709/203 |
| 6,836,803 B1 * | 12/2004 | Swartz et al. ................ 709/227 |
| 6,941,341 B2 * | 9/2005 | Logston et al. ............. 709/203 |
| 6,956,845 B2 * | 10/2005 | Baker et al. .................. 370/352 |
| 6,959,335 B1 * | 10/2005 | Hayball et al. .............. 709/227 |
| 7,043,524 B2 * | 5/2006 | Shah et al. .................. 709/203 |
| 7,058,704 B1 * | 6/2006 | Mangipudi et al. ......... 709/223 |
| 7,076,552 B2 * | 7/2006 | Mandato ..................... 709/226 |
| 7,099,879 B2 * | 8/2006 | Tacaille et al. .............. 707/100 |
| 7,185,070 B2 * | 2/2007 | Paul et al. .................... 709/220 |
| 7,206,846 B1 * | 4/2007 | Dini et al. .................... 709/228 |
| 7,213,071 B2 * | 5/2007 | DeLima et al. .............. 709/227 |
| 7,222,345 B2 * | 5/2007 | Gray et al. ................... 718/104 |
| RE39,717 E * | 7/2007 | Yates et al. .................. 709/201 |
| 7,246,174 B2 * | 7/2007 | Sciandra et al. ............ 709/244 |
| 7,260,635 B2 * | 8/2007 | Pandya et al. ............... 709/226 |
| 7,272,625 B1 * | 9/2007 | Hannel et al. ............... 709/200 |
| 7,275,103 B1 * | 9/2007 | Thrasher et al. ............ 709/224 |
| 7,313,533 B2 * | 12/2007 | Chang et al. ................... 705/7 |
| 7,315,826 B1 * | 1/2008 | Guheen et al. ................. 705/7 |

(Continued)

OTHER PUBLICATIONS

Snir, Y. et al. "Policy Quality of Service (QoS) Information Model," RFC 3644, Nov. 2003, pp. 1-73.*

(Continued)

*Primary Examiner* — Ajay Bhatia
(74) *Attorney, Agent, or Firm* — Harness, Dickey & Pierce, P.L.C.

(57) ABSTRACT

A method of managing resources of an information system relative to clients of the system. A quality of service (QoS) message is received from a client expressing QoS requirements as parameter values. A contract is established with the client for quality of service based on the one or more parameter values. One or more resources of the system are allocated to the client based on the contract. This method enables uniform resource management and polymorphic resource allocation across multiple middleware platforms.

29 Claims, 7 Drawing Sheets

U.S. PATENT DOCUMENTS

| | | | | |
|---|---|---|---|---|
| 7,325,233 B2* | 1/2008 | Kuck et al. | | 718/103 |
| 7,328,243 B2* | 2/2008 | Yeager et al. | | 709/205 |
| 7,340,500 B2* | 3/2008 | Traversat et al. | | 709/201 |
| 7,342,886 B1* | 3/2008 | Srinivasan et al. | | 370/235 |
| 7,349,340 B2* | 3/2008 | Sahai et al. | | 370/235 |
| 7,370,364 B2* | 5/2008 | Dobbins et al. | | 726/28 |
| 7,421,509 B2* | 9/2008 | Lolayekar et al. | | 709/235 |
| 7,441,045 B2* | 10/2008 | Skene et al. | | 709/241 |
| 7,457,243 B2* | 11/2008 | Meggers et al. | | 370/230 |
| 7,492,720 B2* | 2/2009 | Pruthi et al. | | 370/252 |
| 7,505,467 B1* | 3/2009 | Buffam | | 370/395.2 |
| 7,536,473 B2* | 5/2009 | Ajanovic et al. | | 709/234 |
| 7,644,153 B2* | 1/2010 | Talwar et al. | | 709/224 |
| 7,783,759 B2* | 8/2010 | Eilam et al. | | 709/226 |
| 2003/0014521 A1* | 1/2003 | Elson et al. | | 709/225 |
| 2003/0037113 A1* | 2/2003 | Petrovykh | | 709/205 |
| 2003/0055668 A1* | 3/2003 | Saran et al. | | 705/1 |
| 2003/0069018 A1* | 4/2003 | Matta et al. | | 455/436 |
| 2003/0120771 A1* | 6/2003 | Laye et al. | | 709/224 |
| 2003/0217128 A1* | 11/2003 | Yanosy | | 709/223 |
| 2004/0117476 A1* | 6/2004 | Steele et al. | | 709/224 |
| 2004/0117478 A1* | 6/2004 | Triulzi et al. | | 709/224 |
| 2004/0153545 A1* | 8/2004 | Pandya et al. | | 709/226 |
| 2004/0181588 A1* | 9/2004 | Wang et al. | | 709/207 |
| 2004/0193703 A1* | 9/2004 | Loewy et al. | | 709/220 |
| 2005/0065879 A1* | 3/2005 | Birch et al. | | 705/40 |
| 2005/0204054 A1* | 9/2005 | Wang et al. | | 709/232 |
| 2009/0116380 A1* | 5/2009 | Santiago et al. | | 370/229 |
| 2011/0125553 A1* | 5/2011 | Mazzoleni et al. | | 705/7.37 |

OTHER PUBLICATIONS

Floyd, S. and Kempf, J. "IAB Concerns Regarding Congestion Control for Voice Traffic in the Internet," RFC 3714, Mar. 2004, pp. 1-32.*

Moore, B. et al. "Information Model for Describing Network Device QoS Datapath Mechanisms," RFC 3670, Jan. 2004, pp. 1-97.*

Zseby, T. et al. "Policy-Based Accounting," RFC 3334, Oct. 2002, pp. 1-44.*

Nichols, K. and Carpenter, B. "Definition of Differentiated Services per Domain Behaviors and Rules for their Specification," RFC 3086, Apr. 2001, pp. 1-24.*

White, K. "Definitions of Managed Objects for Service Level Agreements Performance Monitoring," RFC 2758, Feb. 2000, pp. 1-71.*

Chan, K. et al. "Differentiated Services Quality of Service Policy Information Base," RFC 3317, Mar. 2003, pp. 1-96.*

Huston, G. "Next Steps for the IP QoS Architecture," RFC 2990, Nov. 2000, pp. 1-24.*

Hoffner, Y.;, "Supporting contract match-making," Research Issues on Data Engineering: Information Technology for Virtual Enterprises, 1999. RIDE-VE '99. Proceedings., Ninth International Workshop on , vol., no., pp. 64-71, Mar. 23-24, 1999.*

* cited by examiner

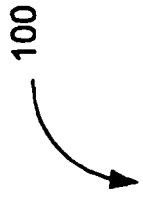

```
<!-- Quality of Service Request Message --><!-- Common Shared Attribute Definition -->
<!ENTITY % time-unit ' unit   (millisecond|second|minute|hour|day) "second"'>
:::
<!-- Root Element: Quality of Service Message                           -->
<!ELEMENT qos-message (profile?, performance?, reliability?, timeliness?, security?)>
<!-- profile encodes the information regarding the requesting client and the messages -->
<!ELEMENT profile (client?, topic?, content-type*)>
<!ELEMENT performance (response-time?, throughput?, volume-rate?, delay?, pay-load?)>
<!ELEMENT response-time EMPTY>
<!ATTLIST response-time %time-period;>
<!-- response-time is the time spent by a single node (e.g., InfoBroker) -->
<!-- from the time a publication is received to the time it is delivered -->
<!ELEMENT reliability (delivery?, loss-probability?, error-rate?, retry?, persistency?, criticality?) >
<!ELEMENT delivery EMPTY>
<!ATTLIST delivery guaranteed-delivery (yes|no) "no"
                    duplication-elimination (yes|no) "no"
                    message-ordering (no|yes) "no"/>
<!-- corresponds to the Web Service Reliability attributes -->
<!ELEMENT timeliness (time-to-live?, deadline?, priority?) >
<!ELEMENT time-to-live EMPTY>
<!ATTLIST time-to-live %time-period; >
<!-- relative to the time when the message is received -->
:::
<!ELEMENT security (signature?, encryption?)>
:::
```

FIG. 2

```
public interface QosManager {
    QoSContract establishQosContract (String clientID, String qosMessage)
                                      throws QosManagerChannelException;
    QoSContract reviseQosContract (String clientID, String qosMessage)
                                      throws QosManagerChannelException;
    void agreeQosContractOffer (String clientID, QoSContract contract)
                                      throws QosManagerChannelException;
    void abortQosEstablishment (String clientID, QoSContract contract)
                                      throws QosManagerChannelException;
}
```

408 — QoSContract establishQosContract
412 — QoSContract reviseQosContract
416 — void agreeQosContractOffer
420 — void abortQosEstablishment

```
public abstract class Resource {
    protected boolean sharable;

public static Resource create(QoSContract contract, Element config, Class clazz) throws ... ;
    public void attach(QoSContract contract) throws ResourceException;
    public void configure(QoSContract contract, Element config) throws ResourceException;
    public void reconfigure(QoSContract contract, Element config) throws ResourceException;
    public void cancel(QoSContract contract) throws ResourceException;
    public void commit(QoSContract contract) throws ResourceException;
    public void release(QoSContract contract) throws ResourceException;
    public void activate() throws ResourceException;
    public void freeze() throws ResourceException;
    public Prediction predict() throws ResourceException;
    public void register(QoSContract contract, Monitor monitor) throws ResourceException;
    public void unregister(QoSContract contract, Monitor monitor) throws ResourceException;
    public void adapt(QoSContract contract, Adaptation adaptation) throws ResourceException;
};
```

FIG. 7

QUALITY OF SERVICE RESOURCE MANAGEMENT APPARATUS AND METHOD FOR MIDDLEWARE SERVICES

FIELD OF THE INVENTION

The present invention relates to information systems and, more particularly, to Quality of Service (QoS) management in information systems.

BACKGROUND OF THE INVENTION

Quality of Service (QoS) management may be implemented in a networked enterprise system to optimize the use of system resources by a plurality of concurrent network applications. Units of work in enterprise systems generally can be considered as either tasks or messages. In an object-oriented system a primitive task may be, for example, a thread of execution of an object. Messages typically are encapsulations of information of various types. Systems tend to be task-oriented or message oriented. Accordingly, known QoS management methods tend to be either task-oriented or message-oriented.

Although QoS management concepts and frameworks for task-oriented systems and message-oriented systems may be similar, actual implementation techniques tend to be quite different. In task-oriented systems, QoS management techniques typically focus on prioritizing task executions to meet application QoS requirements. In message-oriented systems, QoS management techniques typically focus on quality of message reception, processing, and delivery. Meanings of quality characteristics such as performance and reliability can be slightly different from those in task-oriented systems. For example, message reliability typically means a combination of delivery guarantees, ordering of messages, and duplicate removals. Task reliability, on the other hand, typically means a probability that a task can be successfully executed without failure.

QoS management is currently used in task-oriented systems to support computational applications for getting get high priority tasks done in a timely manner in distributed environments. However, QoS management for message-oriented enterprise systems has not been given as much attention. Such systems include enterprise systems in which service-oriented architectures (SOAS) are implemented. SOAs may be, for example, publish/subscribe, object request broker, peer-to-peer architectures or combinations thereof.

In a publish/subscribe architecture, an information broker provides services to client applications of a system. Information brokers play a central role in information publication, processing, and dissemination in distributed enterprise systems and network centric military systems. Examples of brokered systems include email, information sphere, collaboration, virtual community, and group communication. It can be difficult in a brokered system to meet requirements of critical clients when many concurrent clients and their requests compete for system resources. It has come to the attention of the inventors that known resource management methods for information brokers do not distinguish between clients with different QoS characteristics so that system resources might be managed accordingly.

SUMMARY OF THE INVENTION

The present invention, in one preferred implementation, is directed to a method of managing resources of an information system relative to clients of the system. The method includes receiving a quality of service (QoS) message from a client expressing at least one QoS requirement as at least one parameter value. A contract is established with the client for quality of service based on the at least one parameter value. At least one resource of the system is allocated to the client based on the contract.

In another preferred implementation, a management apparatus for managing quality of service (QoS) in an information system receives at least one QoS requirement from at least one client of the system. The management apparatus also uses at least one QoS requirement to establish at least one contract with the QoS clients, and manages at least one resource of the system in accordance with the contracts.

In yet another preferred implementation, the invention is directed to a QoS management service for use in an enterprise system having a service oriented architecture (SOA). The QoS management service includes a plurality of component services. The component services are configured to receive a QoS message from a service requester of the enterprise system expressing at least one QoS parameter, establish with the service requester and monitor a QoS contract that includes the QoS parameters, and manage at least one resource of the enterprise system based on the monitoring.

The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein:

FIG. 2 is a partial listing of a document type definition (DTD) in accordance with one implementation of the present invention;

FIG. 5 is a listing of a QoS Manager interface in accordance with one implementation of the present invention;

FIG. 7 is a listing of an abstract Resource class in accordance with one implementation of the present invention.

DETAILED DESCRIPTION OF THE PREFERRED EMBODIMENTS

The following description of the preferred systems and methods is merely exemplary in nature and is in no way intended to limit the invention, its application, or uses. Although one or more configurations of the present invention are described with reference to a publisher/subscriber enterprise service-oriented architecture (SOA), the invention is not so limited. Other and additional configurations are contemplated in connection with other types of information systems, including but not limited to other and additional types of service-oriented architectures, enterprise systems and/or networked systems.

Generally, a system having a service-oriented architecture (SOA) may be treated as a composition of a collection of services. Each service may make its functionality available via a clearly defined interface. In a SOA, a service typically is a self-describing and open software component. A SOA includes services, their compositions and interactions.

Figure 1:
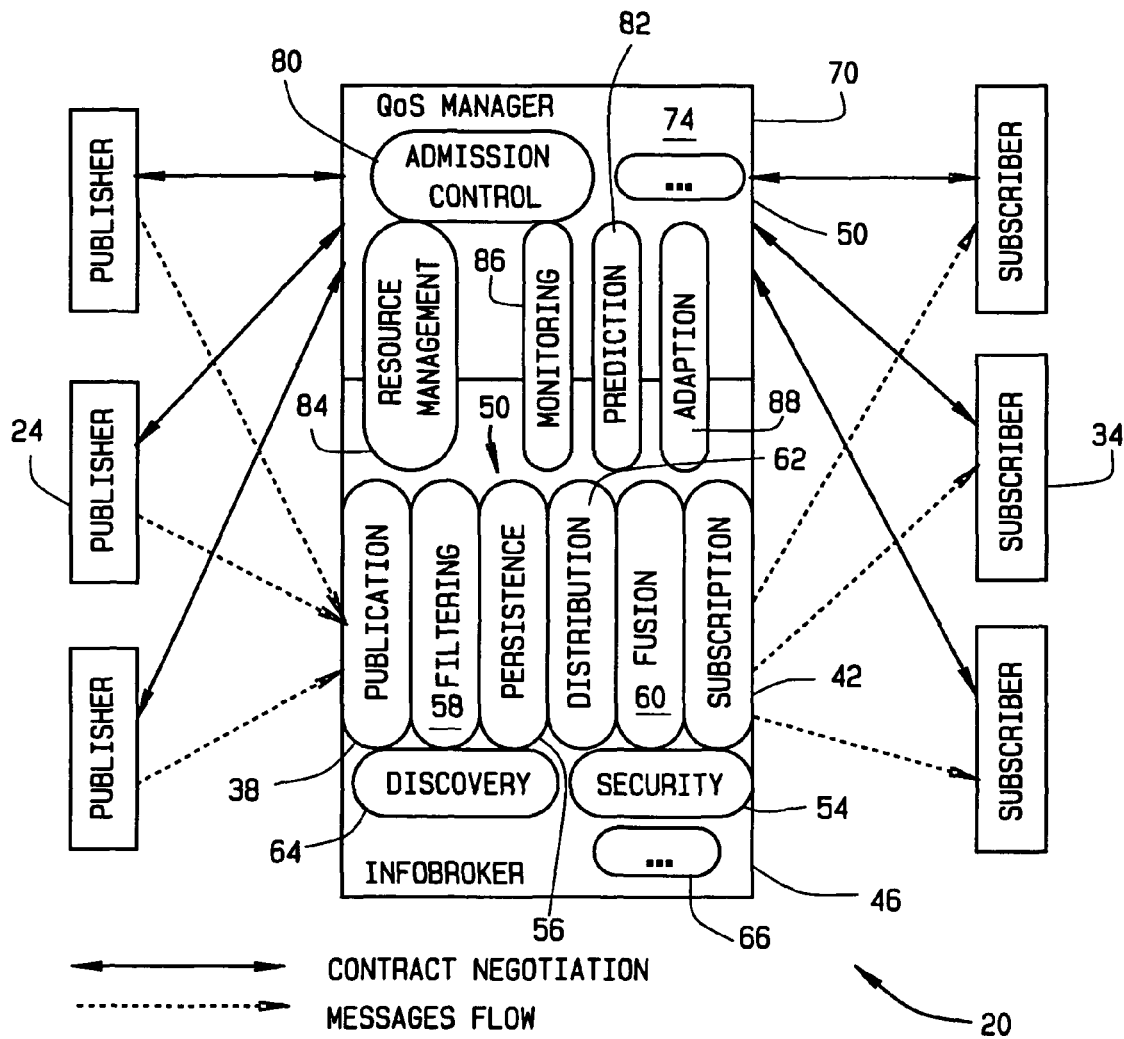
FIG. 1 is a diagram of an information system having a service-oriented architecture (SOA) in accordance with one implementation of the present invention.

An information system having a publish/subscribe SOA in accordance with one embodiment of the present invention is indicated generally in FIG. 1 by reference number 20. Publishers 24 publish messages, for example, on a plurality of topics and subscribers 34 are operated, for example, by interested parties subscribing to messages on particular topics.

Publication services 38 and subscription services 42 are decoupled through an information broker (InfoBroker) 46. The publishers 24 and subscribers 34 are service requestors (also referred to herein as "clients" and "applications") relative to the InfoBroker 46 as a service provider. Publication services 38 and subscription services 42 are included in common services 50 provided by the InfoBroker 46 to the publishers 24 and subscribers 34. Common services 50 also include security 54, persistence 56, filtering 58, fusion 60, distribution 62 and discovery 64. Additional services 66 such as subscription registration may also be provided. The information broker 46 also provides to the clients 24 and 34 a QoS management service 70 as a common service 50. The information broker 46 provides access to a QoS manager 74 through which a client may negotiate a QoS contract as further described below. The information broker 46 provides quality of service to the clients 24 and 34 via the QoS management service 70 as further described below.

In one embodiment, publishers 24 and subscribers 34 can dynamically discover the InfoBroker 46 and use the foregoing services 50. Such services may have different QoS characteristics and interactions of such services may be dynamic and decoupled. Different publishers 24 and subscribers 34 may have different QoS requirements in terms of performance, reliability, timeliness, and security. For example, some publishers 24 may have higher priority than others and may require their message to be guaranteed delivered with correct ordering in faster response time. Similarly, some subscribers 34 may be more critical than others and thus require shorter delays in receiving messages.

The InfoBroker 46, as a service provider, may provide one or more QoS guarantees to one or more publishers 24 and/or subscribers 34. The InfoBroker 46 may restrict one or more behaviors of publishers 24 and/or subscribers 34, for example, rate(s) of receiving or delivering messages per unit of time and/or message payload size(s). To address QoS requirements of a plurality of concurrent clients such as the publishers 24 and subscribers 34, the QoS management service 70 includes such services as admission control 80, prediction 82, resource management 84, monitoring 86, and adaptation 88.

Publishers 24 and subscribers 34 may express their QoS requirements to the InfoBroker 46 and negotiate for QoS contracts as further described below. A QoS contract may be transient (for example, on a per session basis) or permanent (for example, for a client having a particular role). The InfoBroker 46 provides resources and mechanisms for satisfying a QoS contract with a client. The InfoBroker 46 monitors system conditions during executions of QoS contracts and provides appropriate adaptation services as further described below.

QoS management may be implemented as described herein, for example, in Java using JDK1.4. In one configuration, the InfoBroker 46 exports the QoS Manager 74 to make available its QoS management service 70 to clients. A client 24 or 34 sends its QoS requirements as an XML message, as further described below, to the QoS Manager 74. Upon receiving an agreed-upon QoS contract as further described below, the client uses the contract as a context for its interactions (e.g., sending and/or receiving messages) with the InfoBroker 46.

As further described below, the architecture exemplified in FIG. 1 provides component services that cover a plurality of aspects of QoS management for the InfoBroker 46 as QoS service provider. For example, the InfoBroker 46 can analyze application QoS requirements and can make admission control decisions based on policies as well as on current and predicted future system conditions. The InfoBroker 46 can commit system resources and mechanisms to satisfy QoS requirements, and can monitor and adapt system behaviors at runtime.

Generally, in the system 20, QoS requirements for the services 50 are specified in terms of QoS characteristics. A QoS characteristic describes a concrete aspect or constraint understood by both service requesters and service providers. QoS characteristics can be categorized, for example, into four categories: performance, reliability, timeliness and security. A set of QoS parameters can be associated with each category, for example, as follows. Associated with the performance category are: response time, message throughput, payload size, publishing/subscribing volume rate, and end-to-end delay. Associated with the reliability category are: delivery guarantee, duplication elimination, message ordering, loss probabilities, error rate, retry threshold, message persistency and criticality. Associated with the timeliness category are: time-to-live, deadline, constant bit-rate, frame time, and priority. Associated with the security category are message signing and encryption.

It should be noted that the foregoing classification of QoS characteristics and parameters is exemplary. Other and/or additional characterizations and/or classifications of aspects of QoS are contemplated in other and/or additional configurations of the present invention. Based on the foregoing classification of QoS characteristics and parameters, the inventors have developed an XML-based language whereby a service requester may express one or more QoS requirements as a QoS message.

Syntax of the XML-based QoS language may be defined, for example, using an XML Schema or a document type definition (DTD), a portion of which is shown in FIG. 2 and indicated generally by reference number 100. The DTD 100 includes and incorporates the above described categories of QoS characteristics, indicated by reference number 104, and the above described QoS parameters, indicated by reference number 110. In addition to specifying requirements based on the four QoS characteristics categories 104, a service requester also provides self-description in a profile element 116 that may include, for example, client name and role, message topic and content type.

Figure 3:
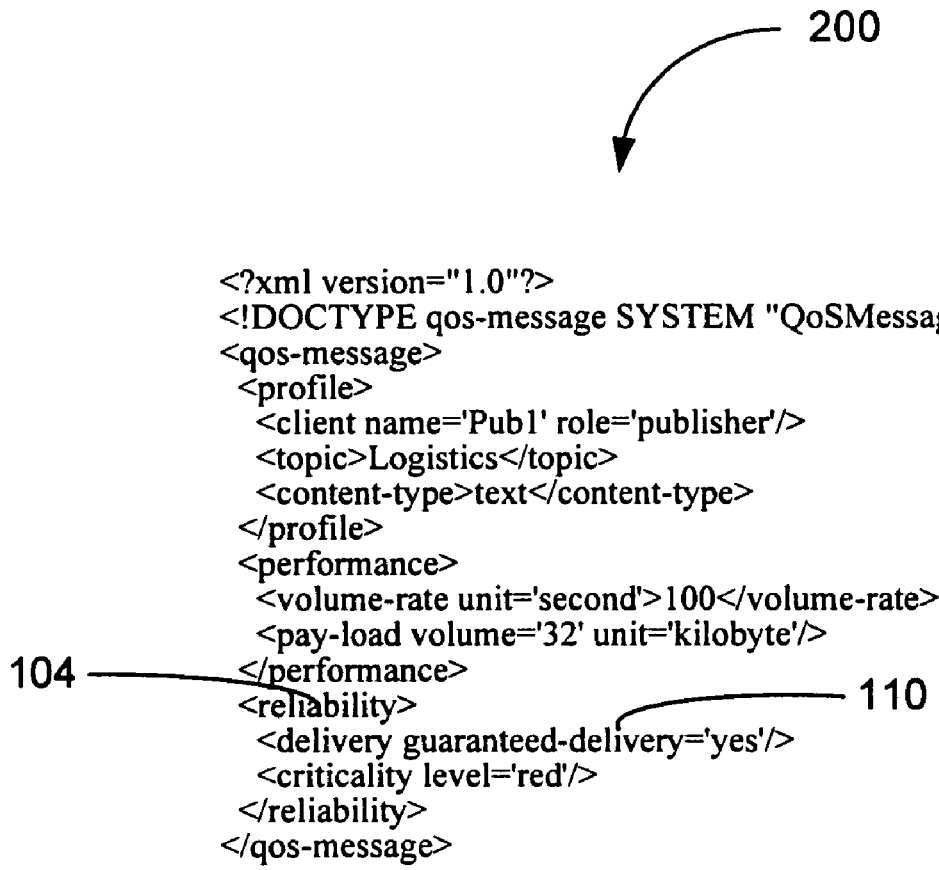
FIG. 3 is a listing of QoS message in accordance with one implementation of the present invention.

In FIG. 3 is shown a portion of an exemplary QoS Message 200 configured using the DTD 100. In the message 200, several QoS parameters 110 are specified (e.g., guaranteed-delivery) and several parameters 110 are omitted (e.g., duplication-elimination). Default values could be used (as specified, for example, in the DTD 100) for omitted parameters.

Figure 4:
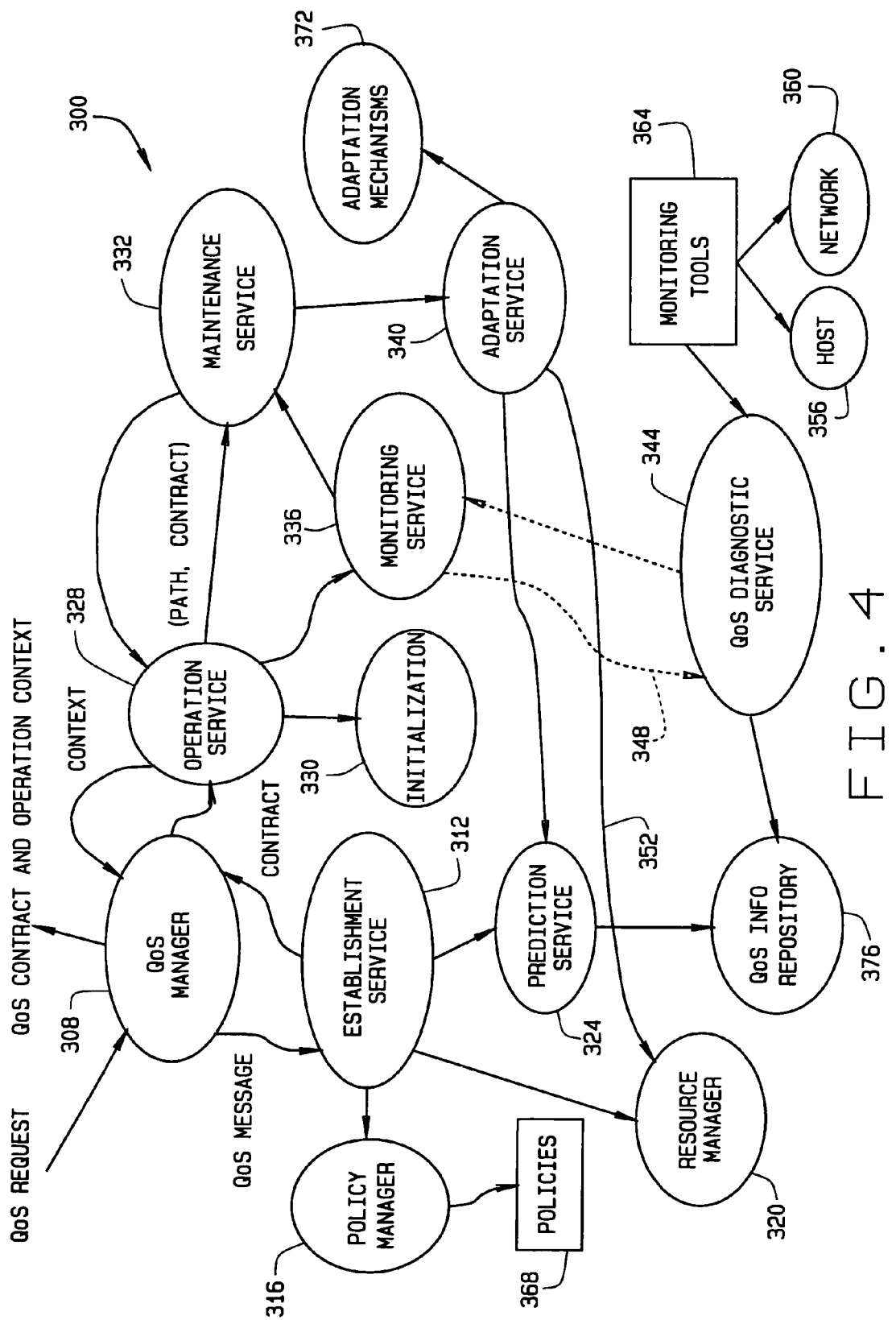
FIG. 4 is a diagram of a QoS management architecture in accordance with one implementation of the present invention.

Generally, a QoS management architecture according to one or more embodiments of the present invention may include component services, their interactions, and interfaces with external services such as real-time hosts and network condition monitoring, for example, through commercial off the shelf (COTS) monitoring tools. One configuration of such an architecture is indicated generally in FIG. 4 by reference number 300. Key component services include a QoS Manager 308, an Establishment Service 312, a Policy Manager 316, a Resource Manager 320, a Prediction Service 324, an Operation Service 328, a Maintenance Service 332, a Monitoring Service 336, an Adaptation Service 340, and a Diagnostic Service 344. In FIG. 4 are shown interactions among the foregoing services. Interactions 348 between the Monitoring service and the QoS Diagnostic service follow a registration and notification style, while interactions 352 among other services are based on a request and reply style. As further described below, the Diagnostic Service 344 interfaces with external services such as a real-time host 356 and network 360 via commercial off the shelf (COTS) monitoring tools 364.

The QoS Manager 308 orchestrates establishment and operation of QoS services for clients. The QoS Manager 308 provides an interface for clients to access QoS management services, as previously discussed with reference to FIG. 1. The Establishment Service 312 may establish a QoS contract for a client given a QoS requirement expressed in an XML QoS message as further described below. The Establishment Service 312 uses the Policy Manager 316, Prediction Service 324, and Resource Manager 320, also as further described below. If a contract cannot be established, the Establishment Service 312 reports to the QoS Manager 308 that made the establishment request on behalf of the client.

The Policy Manager 316 checks QoS policies 368 to ensure that parameters in a client's QoS requirement are permitted for the client's role, and if permitted, what resources and mechanisms are required to satisfy the requirement. The Resource Manager 320 provides resource lifecycle management including reservation, allocation, and release for system resources. Since resources typically are local to a platform (e.g., CORBA, J2EE, Net) of the host 356, the Resource Manager 320 defines abstract classes for general QoS management functions. Concrete resource classes are implemented for each host platform as further described below.

The Prediction Service 324 keeps track of system conditions in terms of several key system parameters (e.g., memory usage, CPU load, network delay). The Prediction Service 324 also predicts future system conditions in a small window of time using various prediction algorithms upon request.

The Operation Service 328 uses an initialization process 330 to initialize resource configuration for a QoS contract and coordinates services during the execution of a QoS contract. The Maintenance Service 332 may maintain one or more key QoS parameters for a QoS contract and may activate the Adaptation Service 340 upon threshold crossings with respect to such parameters. The Monitoring Service 336 samples and aggregates QoS parameter values. The Monitoring Service 336 registers condition predicates with the Diagnostic Service 344, which returns with notifications when the predicates become true, e.g, due to changes in system conditions.

The Adaptation Service 340 dynamically changes resources and mechanisms 372 in order to restore key QoS parameters within normal ranges. The Adaptation Service 340 may also take actions upon contract violations by clients. Such actions may include, for example, slowing down message acceptance from a client which publishes far beyond its agreed publishing rate. When, for example, an observed parameter returns below its threshold value, the Maintenance Service 332 may request the Adaptation Service 340 to restore a QoS level according to the QoS contract. An adaptation mechanism 372 can be a plug-in. Thus appropriate adaptation mechanisms 372 can be statically configured and dynamically selected based on policies.

The Diagnostic Service 344 uses formal reasoning models such as causal networks to aggregate low level system signals into attributes on system conditions. The Diagnostic Service 344 takes real-time inputs from monitoring tools 364, aggregates data on the fly, and stores the data in a repository 376. The Diagnostic Service 344 may also evaluate any predicates on the attributes upon value changes and trigger notifications to interested parties, for example, the Monitoring Service 336.

Clients access QoS management services through the QoS Manager 308 by querying a QoS service provider (e.g., an information broker as described with reference to FIG. 1) or by using a discovery service. In the present embodiment, the QoS Manager 308 is the only component in the QoS management architecture 300 with which a client directly interfaces for QoS services. An exemplary QoS Manager interface, defined, for example, in Java, is referred to generally in FIG. 5 by reference number 400. The interface 400 provides, for example, an operation 408 for establishing a QoS contract, an operation 412 for revising a QoS contract, an operation 416 for agreement on a QoS contract offer, and an operation 420 for aborting establishment of a QoS contract.

Figure 6:
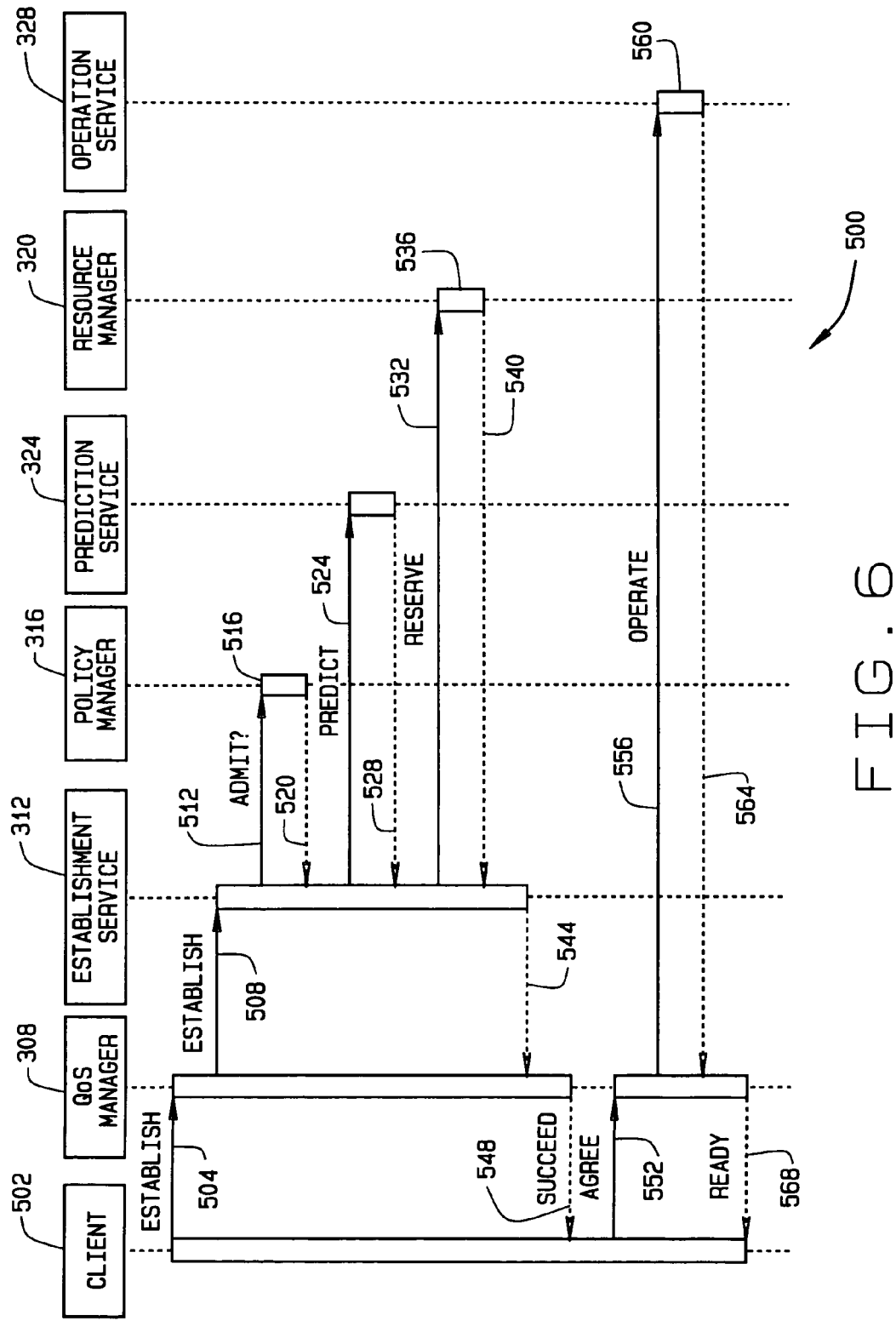
FIG. 6 is a sequence diagram of a success path for establishing a QoS contract in accordance with one implementation of the present invention.

A UML sequence diagram of an exemplary success path for establishing a QoS contract is indicated generally in FIG. 6 by reference number 500. Upon receiving a request from a client 502, at step 504 the QoS Manager 308 extracts a QoS message, which includes the client's role, credentials, and QoS requirements as previously discussed with reference to FIGS. 2 and 3. At step 508 the QoS Manager 308 requests the Establishment Service 312 to try to create a QoS contract that satisfies the requirements appropriate for the client's role.

At step 512 the Establishment Service 312 interprets the QoS message and requests the Policy Manager 316 to start an admission control process to determine whether the system 300 can admit the client 502 based on its role and requested QoS parameters. If the Policy Manager 316 denies the client's request, the Establishment Service 312 returns a message to the QoS Manager 308, which notifies the client as to the denial. The client 502 has a chance to revise its QoS requirements, for example, via the reviseQosContract operation 412 in the interface 400. If the Policy Manager 316 determines at step 516 that the client's request is consistent with policies of the system, the Policy Manager 316 returns at step 520 a set of resources and mechanisms that are to be allocated and activated for the client's request to the Establishment Service 312.

At step 524 the Establishment Service 312 queries the Prediction Service 324 for a then-current system condition (e.g., lightly loaded, normal, overloaded, etc.) and predicted availability of resources in the near future. If at step 528 the Prediction Service 324 indicates that resources are available, at step 532 the Establishment Service 312 requests the Resource Manager 320 to reserve the resources at step 536. If the Resource Manager 320 at step 540 indicates that resources are successfully reserved, the Establishment Service 312 at step 544 returns to the QoS Manager 308 with a QoS contract, which includes resources and mechanisms that meet QoS requirements of the client 502. The QoS Manager 308 forwards the contract to the client 502 at step 548. If the contract does not succeed, the Establishment Service 312 returns exceptions to the QoS Manager 308, which notifies the client 502.

At the client's agreement on a QoS contract at step 552 (for example, via the agreeQosContractOffer operation 416 in the interface 400), at step 556 the QoS Manager 308 requests the Operation Service 328 to commit and initialize the appropriate resources and mechanisms, set up monitors for QoS parameters if appropriate, and to connect the Monitoring Service 336 and Adaptation Service 340 with the Maintenance Service 332. At step 560 the Operation Service 328 uses the initialization process 330 to request self-configuration of the appropriate resources, set properties of mechanisms, and activate the resources and mechanisms to start operations. QoS parameter values requested by the client and included in the QoS contract are translated into attribute value settings on allocated resources. It should be noted that the inventors treat mechanisms as active resources, since execution of a mechanism typically requires one or more system resources, for example, CPU time. At step 564 the Operation Service 328 indicates to the QoS manager 308 that resources are committed and initialized. At step 568 the QoS manager 308 forwards the foregoing information to the client 502.

Generally, to directly support enterprise information services such as publish/subscribe, the QoS Resource Manager 320 directly manages resources at a middleware layer, e.g., message queues and/or delivery threads used in a publish/subscribe enterprise information architecture. Such resources tend to be middleware-platform-dependent and implementation-specific, e.g., different publish/subscribe services may use different logic to implement message queues and/or message delivery mechanisms. In one configuration of the present invention, the QoS Resource Manager 320 manages both passive resources, e.g., buffers, and active resources, e.g., threads. Active resources may be used to encapsulate mechanisms. Such resources may include algorithms for guaranteed message delivery, removing duplicates, and adaptation. The Resource Manager 320 manages active resources and passive resources in the same or a similar manner, except that active resources may be activated and/or frozen from time to time.

So that the Resource Manager 320 may be decoupled from a host platform and specific enterprise information services, resources are self-configurable, i.e., a resource "knows" what it is designed to do. For example, a receiver thread resource knows how to configure itself with a message queue so that it can store received messages to the queue. Additionally, a resource complies with a common management interface as further described below, so that the Resource Manager 320 can manage resources without referring to implementation logic for such resources.

In one configuration, a common management interface is provided using an abstract Resource class indicated generally in FIG. 7 by reference number 600. The Resource Manager 320 uses the interface 600, for example, at 604 to create, at 608 to configure, at 612 to commit, at 616 to cancel, at 620 to activate, at 624 to freeze, and/or at 628 to release resources, as well as at 632 to predict OS level resource consumption for each resource. The interface 600 also allows resources at 636 to register monitoring probes and at 640 to expose adaptation mechanisms to the QoS management service 300. Resources provide the implementation of the management interface 600 by subclassing the class represented in the interface 600. Such subclassing can be performed by implementing a resource as an object of a subclass, or by providing a proxy of the resource as an object of a subclass. Additionally, active resources implement an executable interface such as the Java Runnable interface in a J2EE-based middleware platform.

To support critical service requests, resources may be dedicated to a single QoS contract (for example, for a client with high QoS requirements). To support scalability of enterprise information services, resources may be shared by many different QoS contracts (possibly by different clients). An "attach" method 644 may be used to share an existing resource with a new QoS contract.

The Resource Manager 320 may use a policy-driven or optimization-based approach to manage the resources, e.g., to make a decision as to whether to create a new resource or share an existing resource, whether to cancel particular resources or commit such resources for use. In a policy-driven approach, the Resource Manager 320 can use a local policy to decide for each requested resource whether to create a new instance or to share an existing one when the Establishment Service 312 asks it to reserve resources for a given QoS contract. If a new instance is preferred or required, the Resource Manager 320 uses the "create" method 604 in the abstract Resource class 600 to create a new resource with configuration information supplied by the particular contract (and possibly modified by the policy). If sharing is preferred, the Resource Manager 320 chooses an existing resource and possibly reconfigures it using new configuration information.

If contract negotiation fails, the Resource Manager 320 cancels all reservations of appropriate resources. Otherwise, the Resource Manager 320 requests the appropriate resources to commit to a given contract. When a contract is released, the Resource Manager 320 requests the appropriate resources to release themselves. As previously mentioned above, other methods in the interface 600 may not be used directly by the Resource Manager 320 but may be used by other components to operate QoS contracts.

In one configuration, a plurality of Resource subclasses are implemented. For example, a subclass InCommChannel encapsulates an in-coming network communication channel (e.g., socket port). A subclass OutCommChannel encapsulates an out-going network communication channel (e.g., destination IP and port). A subclass MessageQueue stores messages received from InCommChannel. A subclass NotificationQueue stores messages to be delivered with destination information attached to each message. A subclass Receiver thread receives bytes from the InCommChannel, assembles them into messages and pushes messages into the MessageQueue. A subclass Distributor thread distributes messages to NotificationQueues and assigns appropriate destination information according to message topic and all registered subscriptions. A subclass Deliver thread delivers messages in NotificationQueues to the destination. Receiver, Distributor, and Deliver threads are active resources. Once committed, active resources drive the execution of, for example, a publish/subscribe service for all clients.

The foregoing various configurations of the present invention may be seen additionally to embody a machine-readable medium for use with a processor having a memory. The machine-readable medium includes instructions to cause a processor to receive a quality of service (QoS) message from a client of an information system expressing one or more QoS requirements as one or more parameter values. The machine-readable medium also includes instructions to cause a processor to establish a contract with the client for quality of service based on the one or more parameter values. Additionally, the machine-readable medium includes instructions to cause a processor to allocate one or more resources of the information system to the client based on the contract.

In a SOA in which a configuration of the foregoing QoS management system is implemented, an InfoBroker can offer differentiated services to clients of different roles and QoS requirements. The InfoBroker thus can optimize the allocation and utilization of resources to satisfy requirements from many concurrent clients. Highly critical clients get more resources or more shares of resource utilization than less critical clients.

Configurations of the foregoing system can be used to manage network throughput to provide reliable information delivery based on priorities. Because resources are modeled in an object-oriented approach, the foregoing method enables uniform resource management and polymorphic resource allocation across multiple middleware platforms. The foregoing method for resource allocation is easier to use and is more flexible than other methods currently available. System costs can be reduced while resource needs of critical clients can be satisfied.

The above-described XML-based QoS language provides a flexible and extensible way for applications to express QoS requirements in various aspects of QOS characteristics. QoS service providers thus can be provided with an architecture that integrates and processes of all aspects of QoS characteristics in a single framework. In the foregoing system, resources of an information system are modeled as software objects to provide polymorphic resource allocation across multiple middleware platforms. QoS characteristics for both tasks and messages are managed in a single framework. QoS requirements of concurrent applications are satisfied, for example, through a QoS service provider in a system middleware layer.

Resources are classified into categories based on their utilities, greatly simplifying their configurations at runtime. The foregoing resource allocation method may be policy-based and is easily modified and extensible. The method demonstrably shortens delays for highly critical clients than less critical clients by effectively managing allocated resources. Configurations of the present invention can adapt resource allocations when runtime behaviors of clients change to enforce client QoS contracts.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. A method of managing resources of a service-oriented information system having a service-oriented architecture (SOA), the method comprising:
   providing information services, quality of service (QoS) management services, and resource management services to a plurality of client applications;
   receiving a quality of service (QoS) message from a client application expressing at least one QoS requirement as at least one parameter value;
   notifying the client that the at least one QoS requirement is denied;
   receiving a revised QoS message from the client and negotiating a contract with the client for quality of service based on the revised message;
   allocating at least one resource of the system to the client based on the negotiated contract; and
   when the client is using the at least one allocated resource:
   monitoring QoS parameters with regard to the negotiated contract to determine whether the client is using the at least one allocated resource in accordance with the negotiated contract, and changing the allocation specifically as to the client application of the at least one allocated resource in response to usage of the at least one allocated resource by the client application determined to be not in accordance with the negotiated contract;
   the providing, receiving, notifying, allocating, monitoring, and changing performed by an information broker of the system, the information broker executed by a processor configured with memory included in the system.

2. The method of claim 1, wherein the client expresses the at least one QoS requirement in a plurality of categories of QoS characteristics.

3. The method of claim 1, further comprising, through the broker, governing interaction of the client with the system based on the contract.

4. The method of claim 1, further comprising:
   receiving a plurality of QoS messages from a plurality of the clients; and
   allocating resources of the system based on a resource allocation policy.

5. The method of claim 1, wherein allocating at least one resource comprises using a common management interface to implement a self-configuration of at least one self-configurable resource.

6. The method claim 5, wherein implementing a self-configuration of at least one self-configurable resource comprises implementing a resource as an object of a subclass of an abstract resource class.

7. The method of claim 1, further comprising using the at least one parameter value to set at least one QoS value for the at least one resource.

8. The method of claim 1, wherein establishing a contract comprises allowing the client to revise the parameter values to become consistent with a resource allocation policy of the system.

9. The method of claim 1, performed as a service invoked by the client.

10. The method of claim 1, further comprising:
    receiving a plurality of QoS messages from a plurality of clients preparing to publish or subscribe a message or request a task execution; and
    establishing contracts with the clients for quality of service based on their requirements expressed in the QoS messages.

11. A management apparatus for managing quality of service (QoS) in an information system having service-oriented architecture, the management apparatus comprising:
    a processor and memory; and
    an information broker encoded in the Memory and executable by the processor to provide information services, quality of service (QoS) management services, and resource management services to a plurality of client applications;
    the broker executable by the processor to:
    receive a quality of service (QoS) message from a client application expressing at least one QoS requirement as at least one parameter value;
    notify the client that the at least one QoS requirement is denied;
    receive a revised QoS message from the client and negotiate a contract with the client for quality of service based on the revised QoS message;
    allocate at least one resource of the system to the client based on the negotiated contract;
    while the client is using a resource allocated to the client as a result of the contract, manage the allocated resource in accordance with the contract and monitor the allocated resource to determine whether the client is using the allocated resource in accordance with the contract; and
    change a QoS attribute of the resource allocated to the client, the change specific to the client and based on a determination by the broker that a QoS parameter for the allocated resource has varied from a value established in the contract.

12. The management apparatus of claim 11, the broker further executable by the processor to express and query a plurality of levels of QoS policies defined for network systems.

13. The management apparatus of claim 11, the broker further executable by the processor to allocate the at least one resource to a client based on a policy.

14. The management apparatus of claim 11, the broker further executable by the processor to manage the at least one resource using a common management interface.

15. The management apparatus of claim 11, wherein the managing is decoupled from platform for which the at least one resource is implemented.

16. The management apparatus of claim 11, configured as one of a plurality of services of the information system.

17. A quality of service (QoS) management service for use in an enterprise system having a service oriented architecture (SOA), the QoS management service comprising a processor and memory of the enterprise system and a broker for a plurality of component services, the broker configured in the memory and executable by the processor to:
 receive a QoS message from a service requester of the enterprise system expressing at least one QoS parameter;
 notify the service requester that the at least one QoS parameter is unacceptable;
 create a contract with the service requester for quality of service based on a revised QoS message received from the service requester;
 allocate at least one resource of the system to the service, requester based on the created contract;
 when the contract has resulted in a resource having been allocated to the service requester and when the service requester is using the allocated resource, monitor the QoS parameters in the contract pertaining to the allocated resource to determine whether the contract is being adhered to by the service requester; and
 adapt allocation of the resource to enforce the contract of the service requester when the service requester is using the at least one resource, the changing performed specifically the service requester and based on the determining.

18. The QoS management service of claim 17, wherein the component services are further configured to adapt at least one resource of the enterprise system based on the monitoring.

19. The QoS management service of claim 17, wherein the component services are made available to the service requester by the processor through the broker.

20. The QoS management service of claim 17, wherein the component services are configured to manage a plurality of resources of the enterprise system based on a plurality of QoS contracts with a plurality of service requesters.

21. The QoS management service of claim 20, wherein the plurality of service requesters comprise tasks and messages.

22. The QoS management service of claim 17, wherein the component services are configured in a middleware layer of the enterprise system.

23. A non-transitory machine-readable medium for use with a processor having a memory, the machine-readable medium comprising:
 instructions executable by the processor to provide a broker service commonly available to a plurality of client applications for quality of service (QoS) management in an information system having a service-oriented architecture (SOA);
 instructions executable by the processor receive, through the broker, a quality of service (QoS) message from a client application of the information system expressing at least one QoS requirement as at least one parameter value;
 instructions executable by the processor to negotiate, through the broker, a contract with the client for quality of service based on the at least one parameter value,
 instructions executable by the processor to allocate, through the broker, at least one resource of the information system to the client based on the contract; and
 instructions executable by the processor to, through the broker, create and directly manage the new resource at a middleware layer of the information system, wherein to directly manage the resource comprises to change a QoS attribute of the resource specifically as to the client and based on a determination by the broker that a QoS parameter for the allocated resource has varied from a value established in the contract.

24. An apparatus comprising:
 a computer-readable memory device having code embodied thereon to provide an information broker for an information system having a service-oriented architecture (SOA), the broker configured to, when executed by a processor of the information system, provide information services, quality of service (QoS) management services, and resource management services to a plurality of client applications;
 the broker further configured to receive a quality of service (QoS) message from a given client application and negotiate, via a QoS management service exported by the broker to the given client application, a contract with the given client application for a given quality of service based on at least one parameter value in the QoS message;
 the broker further configured to create at least one new resource of the information system based on the contract, to monitor use of the created resource with regard to the contract and the given quality of service after the created resource has been allocated under the contract to the given client application and as the created resource is being used the given client application, and to at least temporarily adapt use of the created resource by the given client application, while the resource is being used, to restore operation of the given client application under the contract to the given quality of service.

25. A QoS management service for use in an enterprise system, having a service oriented architecture (SOA), the QoS management service comprising: a processor of the enterprise system, the processor having memory configured with code executable by the processor to provide a broker through which information services, quality of service (QoS) management services, and resource management services are provided to a plurality of client applications; the broker configured to provide:
 a QoS manager configured to receive a QoS message from a client application of the system expressing at least one QoS parameter;
 an establishment service configured to establish with the client a QoS contract that includes the at least one parameter as revised from a previous QoS message from the client application; and
 a resource manager configured to reconfigure and allocate to the client at least one resource of the system based on the established contract;
 the broker further configured to enforce the established contract by adapting the allocation specifically as to the client during a period in which the client uses the at least one resource outside the established contract.

26. The QoS management service of claim 25, further comprising a policy manager configured to:

check at least one policy of the system with regard to the at least one QoS parameter; and determine at least one resource for satisfying a requirement of the client expressed in the at least one QoS parameter.

27. The QoS management service of claim 25, further comprising an operation service configured to commit and initialize the at least one resource.

28. The QoS management service of claim 25, further comprising a prediction service configured to:

track system conditions in terms of the at least one QoS parameter; and predict a future system condition based on the tracked conditions.

29. The QoS management service of claim 25, further comprising an adaptation service configured to change a resource based on the at least one QoS parameter.

* * * * *